(12) United States Patent
Nelson et al.

(10) Patent No.: US 10,766,559 B1
(45) Date of Patent: Sep. 8, 2020

(54) VEHICLE WITH SHOCK-ABSORBING PLATFORM

(71) Applicants: Royce Nelson, Oakland, CA (US); Phillip H. Neal, San Rafael, CA (US)

(72) Inventors: Royce Nelson, Oakland, CA (US); Phillip H. Neal, San Rafael, CA (US)

( * ) Notice: Subject to any disclaimer, the term of this patent is extended or adjusted under 35 U.S.C. 154(b) by 0 days.

(21) Appl. No.: 16/271,768

(22) Filed: Feb. 8, 2019

Related U.S. Application Data (60) Provisional application No. 62/629,004, filed on Feb. 10, 2018.

(51) Int. Cl.
*B60K 3/02* (2006.01)
*B62K 3/00* (2006.01)

(52) U.S. Cl.
CPC .......... *B62K 3/002* (2013.01); *B62K 2201/06* (2013.01)

(58) Field of Classification Search
CPC .......... B62K 21/10; B62K 5/05; B62K 3/002; B62K 5/08
See application file for complete search history.

(56) References Cited

U.S. PATENT DOCUMENTS

| | | | |
|---|---|---|---|
| 8,857,831 B1* | 10/2014 | Rotondo | A63C 17/0046 280/11.27 |
| 9,987,547 B2* | 6/2018 | Ruschkowski | A63C 17/12 |
| 2002/0067018 A1* | 6/2002 | Shaw | B62M 1/00 280/220 |

* cited by examiner

*Primary Examiner* — John D Walters
*Assistant Examiner* — James J Triggs
(74) *Attorney, Agent, or Firm* — Patent Law Offices of Michael E. Woods; Michael E. Woods (57) ABSTRACT

A system and method for a rider with an improved rider-controlled recreation vehicle. A recreational vehicle with a platform medium, for example a wide fabric strap rider platform (versus a hard surface like metal, wood or the like) supported only at the ends. Advantages may include that it provides shock absorption, more road "feel", different performance characteristics, and more comfort than a traditional hard platform. The platform may also be adjusted for more or less tension for different riding surfaces and conditions and the strapping can easily be replaced with natural wear or to personalize the look with custom graphic designs.

9 Claims, 5 Drawing Sheets

VEHICLE WITH SHOCK-ABSORBING PLATFORM

CROSS REFERENCE TO RELATED APPLICATIONS

This Application claims the benefit of U.S. Provisional Application 62/629,004 filed on Feb. 10, 2018, the contents of which are hereby expressly incorporated by reference thereto in their entireties.

FIELD OF THE INVENTION

The present invention relates generally to rider vehicles, and more specifically, but not exclusively, to an open vehicle operating over a surface, the vehicle having a rider board upon which a rider is positioned and from which the rider has a control for the vehicle using a hand or foot contacting the surface, the control may include at least occasional propulsion or steering of the vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There are many rider-controlled recreation vehicles, many of which include a rider platform mounted on one or more wheels, and sometimes an extended steering handle, in which the vehicle is propelled by resting one foot on the rider platform and pushing the other foot against the ground. Some of these vehicles may include a motor to partially or wholly propel the vehicle forward.

Due to the popularity of these recreation vehicles, riders and manufacturers continue to seek improvement of some characteristic. It may be advantageous to provide a rider with an improved rider-controlled recreation vehicle.

BRIEF SUMMARY OF THE INVENTION

Disclosed is a system and method for providing a rider with an improved rider-controlled recreation vehicle. The following summary of the invention is provided to facilitate an understanding of some of the technical features related to rider-controlled recreational vehicles and is not intended to be a full description of the present invention. A full appreciation of the various aspects of the invention can be gained by taking the entire specification, claims, drawings, and abstract as a whole. The present invention is applicable to other vehicles in addition to rider-controlled recreation vehicles, including kick scooters, longboards, skateboards, hover boards, and the like, some of which may be wholly or partially motorized.

An embodiment of the present invention may include an open rider-controlled recreational vehicle having a rider board upon which a rider is positioned and from which the rider has a control for the vehicle using a hand or foot contacting the surface, the control may include at least occasional propulsion or steering of the vehicle. The rider platform includes a pair of spaced apart supports from which a platform medium is suspended, the medium may be intentionally tensioned from the ends only to at least perceptively flex, bow, stretch, and/or bounce when a rider stands, kneels, sits, or lays upon the medium. The supports may provide a mechanism to tighten or relax the tautness of the medium. The vehicle may include a set of motive elements, for example one or more wheels, that may be coupled to the supports, for vehicle motion over the surface. The vehicle may be implemented in many different formats, many of which include the rider standing on the platform medium with one foot as they propel the vehicle over the surface with the other foot. Some formats may include an optional directional apparatus that controls a steering of the apparatus, such as varying a rotational direction of at least one motive element using a handle to steer the vehicle by turning the handle.

The medium may include one or more textile fibers (animal, plant, mineral, synthetic, or combination) assembled together to produce a flexible material having a manufactured network of those natural or artificial textile fibers. The manufacturing may include a weaving, meshing, knitting, knotting, felting, crocheting, or machine-implemented assembly process operating on one or more textile fibers or fiber precursors.

An embodiment of the present invention may include one or more advantages, including: a) flexible-mesh decks may provide super-smooth ride and soft platform feel for maximum comfort; b) flexible decks may add spring to jumps and may add cushion to landings; c) flexible decks may absorb road vibration and may provide shock absorption (a problem with traditional scooter and skateboards); d) flexible decks may flow smoothly on turns and "bend" at the edges as the rider turns the recreational vehicle, e) flexible decks may provide a mechanism for variable tension adjustment depending on skill level and riding surface and activity (e.g. cruising or stunts or the like); and f) may provide a new type of user experience and may include customizable features such as swap out decks with custom graphics and colors.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for a rider with an improved rider-controlled recreation vehicle. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "slackline rider platform" refers to a rider platform having an assembly including a platform medium suspended and dynamically tensioned between supports, the platform medium is intentionally non-rigid to at least perceptively flex, bow, stretch, and/or bounce when a rider stands, kneels, sits, or lays upon the medium. The supports may provide a mechanism to tighten or relax the tautness or tension of the platform medium. The platform medium may include one or more textile fibers (animal, plant, mineral, synthetic, or combination), that may include natural or synthesized elastic polymer substances, assembled together to produce a flexible material having a manufactured network of those natural or artificial textile fibers. The manufacturing may include a weaving, meshing, knitting, knotting, felting, crocheting, webbing, roping, or machine-implemented assembly process operating on one or more textile fibers or fiber precursors. This platform medium is responsive to the weight of the user to intentionally and significantly flex, bow, stretch, and/or bounce under dynamic loading and perceptively adjust to the user during maneuvers of the vehicle. This is in contrast to a conventional plank rider deck of a recreational vehicle that may imperceptivity flex but not in the nature of a dynamically-tensioned structure from textile, fabric, rope, mesh, cable, or the like suspended and tensioned between a pair of supports. A characteristic of this platform medium in some cases is that the medium is not otherwise supported except at the ends of the medium. Some variations of the present invention may include more conventional deck materials (solid wood, metal, polymeric, or combination planks) that are supported only at the ends, subject to dynamic tension, and strong enough to not structurally fail under anticipated loading of a rider standing, kneeling, sitting, or laying on the deck. In a conventional system, sometimes cushioning/shock absorption is a function of structures associated with the wheels and trucks coupling the wheels to the rider deck. Some embodiments of the present invention may achieve similar levels of shock absorption without those wheel/truck-coupled shock absorbers or having smaller less expensive/bulky shock absorbers because the platform medium contributes may contribute significantly to such function.

An embodiment of the present invention may include an open rider-controlled recreational vehicle having a rider board upon which a rider is positioned and from which the rider has a control for the vehicle using a hand or foot contacting the surface, the control may include at least occasional propulsion or steering of the vehicle. The rider platform includes a pair of spaced apart supports from which a platform medium is suspended, the platform medium is intentionally tensioned with some slack (not rigid) to at least perceptively flex when a rider stands, kneels, sits, or lays upon the medium. The supports may provide a mechanism to tighten or relax the tautness of the medium. The vehicle may include a set of motive elements, for example one or more wheels (often two or more, sometimes three or more, and some implementations having four or more), that may be coupled to the supports, for vehicle motion over the surface. The vehicle may be implemented in many different formats, many of which include the rider standing on the platform medium with one foot as they propel the vehicle over the surface with the other foot. Some formats may include an optional directional apparatus that controls a steering of the apparatus, such as varying a rotational direction of at least one motive element using a handle to steer the vehicle by turning the handle.

Figure 1:
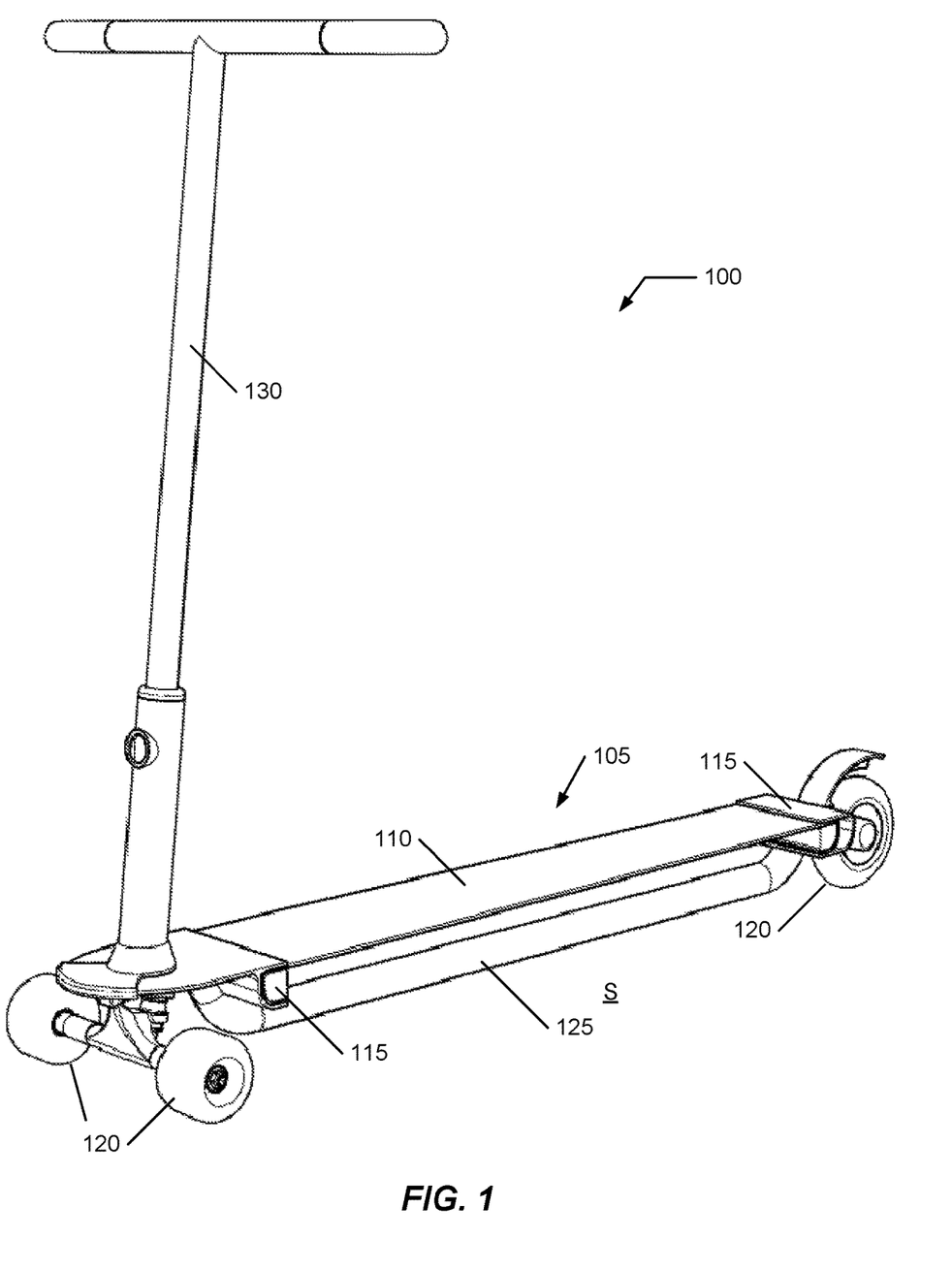
FIG. 1 illustrates a perspective view of an open rider-controlled recreational vehicle including a rider platform having a platform medium.
Figure 2:
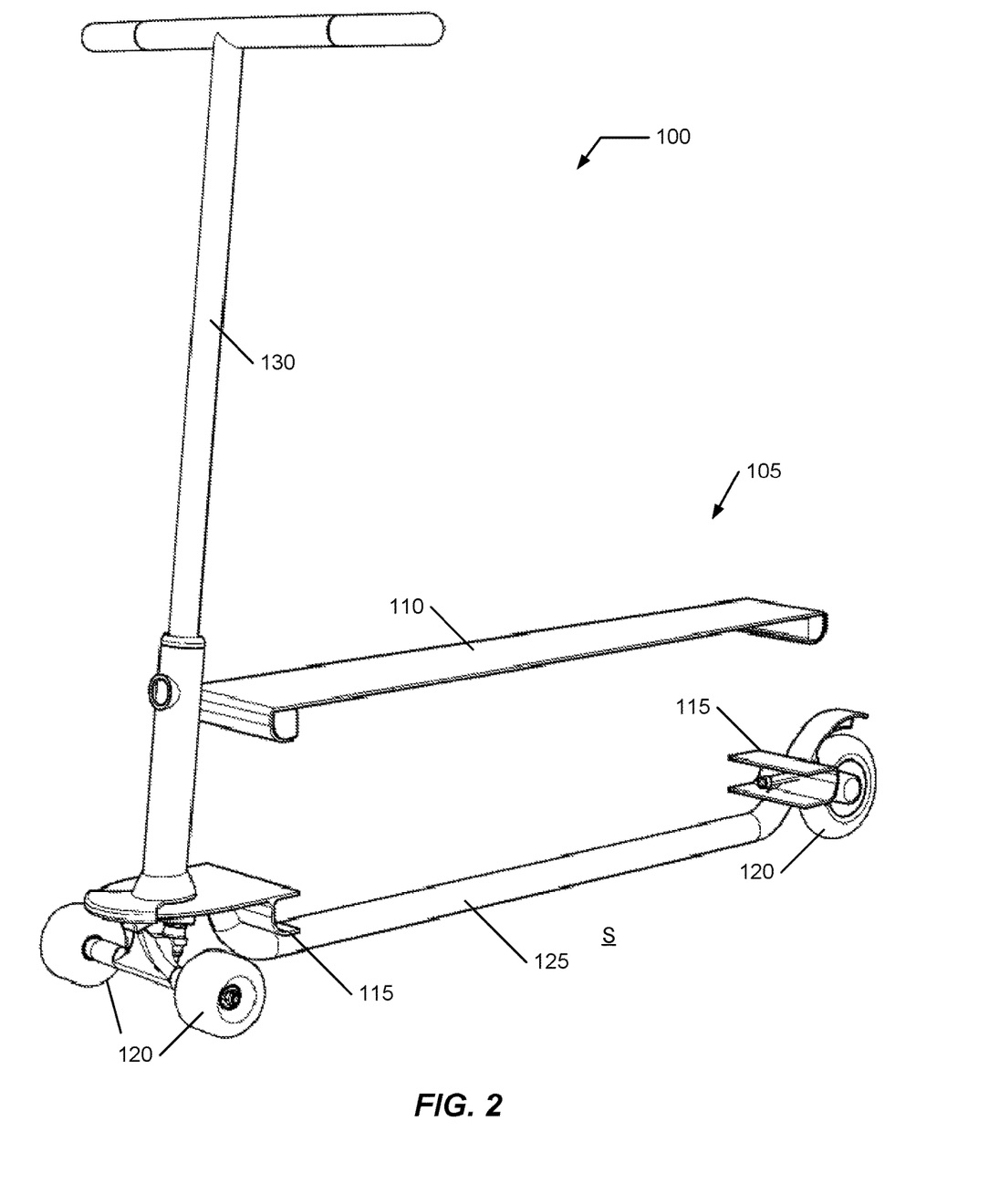
FIG. 2 illustrates a perspective view of a partially disassembled vehicle of FIG. 1.
Figure 3:
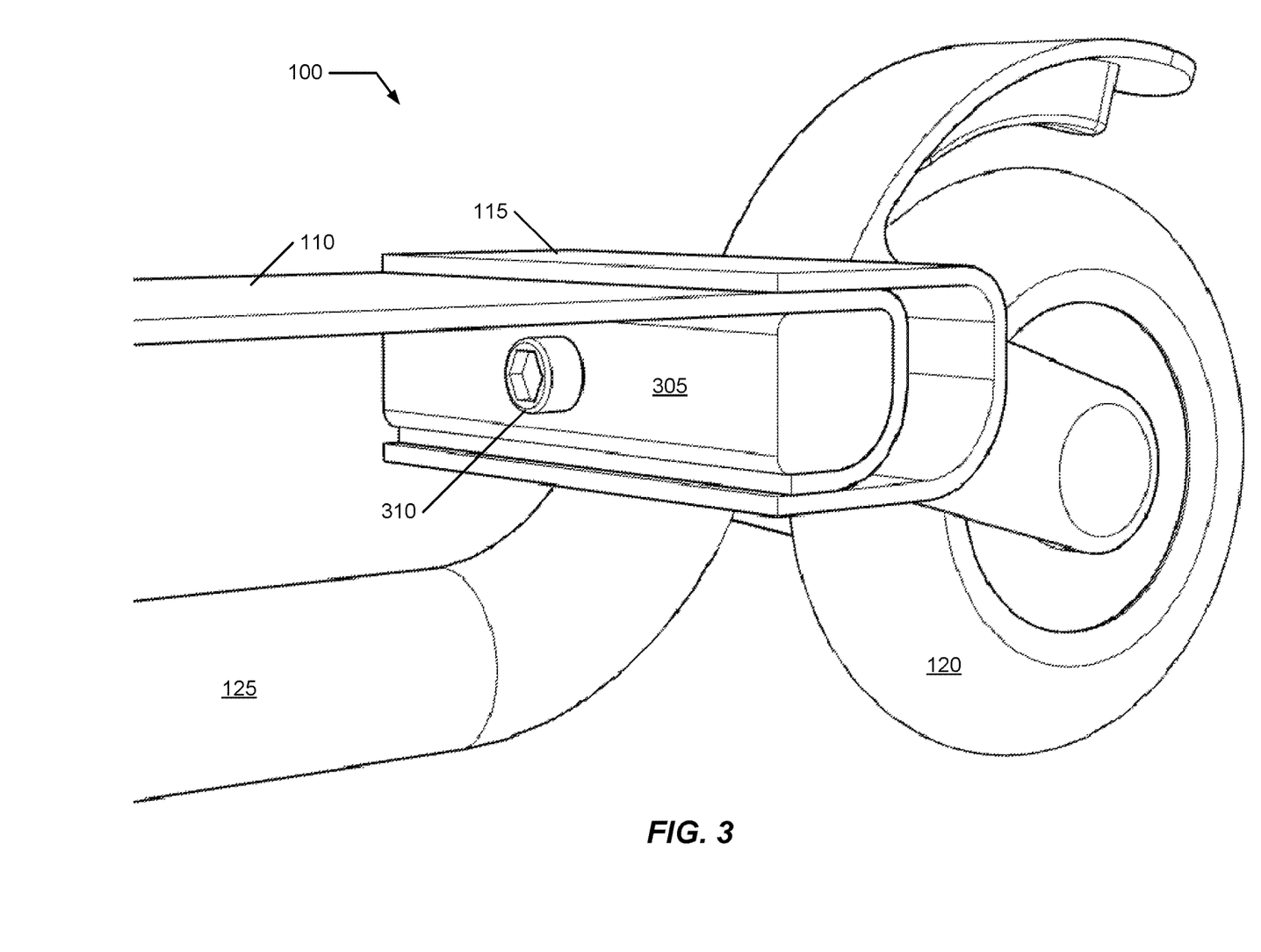
FIG. 3 illustrates a detail view of a tautness control for the recreational vehicle of FIG. 1.

FIG. 1 illustrates a perspective view of an open rider-controlled recreational vehicle 100 including a rider platform 105 having a platform medium 110 suspended and tensioned between a set of supports 115. FIG. 2 illustrates a perspective view of a partially disassembled vehicle of FIG. 1; and FIG. 3 illustrates a detail view of a tautness control for the recreational vehicle of FIG. 1.

Vehicle 100 includes a set of motive elements 120 (e.g., one or more wheels) to engage and roll, slide, glide, skate, slip, and otherwise move over a surface S supporting vehicle 100 during use. Set of motive elements 120 are coupled to a frame 125 that is also coupled to supports 115. Platform medium 110 is not supported in a center portion between supports 115 where a rider is intended to stand, kneel, sit, and/or lay.

Vehicle 100, depending upon its format, may include an optional handle 130 that may, in some implementations, be coupled to one or more motive elements to provide a steering function.

There are many different possible formats in addition to inclusion or exclusion of handle 130. These formats may vary by the number and type of motive elements 120 and the structure, length, height, and other characteristics of frame 125. Vehicle 100 may be implemented as a kick scooter, longboard, skateboard, hover board, hybrid, and the like, some of which may include a motor or engine. Set of motive elements 120 may include one or more wheels, and the wheels may be distributed to support frame 125 above surface S. Those motive elements 120 may be distributed in differing numbers at the ends or along a length of frame 125. For some configurations, appropriate adjustment of steering elements, including steering trucks, may be necessary or desirable as a platform medium may present a "soft edge" for turning and some arrangements of vehicle may desire an overall "hard edge" for certain desirable turning maneuvers.

As illustrated, vehicle 100 includes a forward subset of motive elements 120 and a rearward subset of motive elements 120. A vehicle motive axis extends between the subsets of motive elements (e.g., fore/aft in FIG. 1). Some vehicles 100, such as a hoverboard or human transporters (such as a Segway) have subsets of motive elements orthogonally disposed (e.g., side-by-side) to a direction of motion and the vehicle motive axis is defined as extending between these subsets of motive elements as well. As illustrated, medium platform includes a platform axis that extends generally parallel to the vehicle motive axis. Some implementations may have a different orientation, such as including the platform axis perpendicular to the vehicle motive axis.

The tautness control may include a structure 305 that engages and secures platform medium 110 to control a distance between ends of platform medium 110 when platform medium 110 is engaged with supports 115. For example, a spacer control 310 engages structure 305 to select, set, and secure the distance. There are many mechanical ways to adjust and control the distance. In vehicle 100, the distance between supports 115 is fixed and adjusting structure 305 using spacer control 310, controls the distance, which in turn controls the tautness as a length of platform medium 110 is constant while the distance between the ends changes. As the distance becomes greater, the tautness increases (and a slackness decreases).

As illustrated, spacer control 310 includes a bolt or the like that engages structure 305. Rotating the bolt changes the distance by moving structure 305 relative to support 115.

In operation, rider platform 105 of recreational vehicle 100 will bow substantially, a magnitude of the bowing dependent upon a state of a tautness control for a platform medium 110 included in rider platform 105. The bowing may provide a different rider experience than similar conventional recreational vehicles lacking platform medium 110.

A recreational vehicle with a platform medium, for example a wide fabric strap rider platform (versus a hard surface like metal, wood or the like) supported only at the ends. Advantages may include that it provides shock absorption, more road "feel", different performance characteristics, and more comfort than a traditional hard platform. The platform may also be adjusted for more or less tension for different riding surfaces and conditions and the strapping can easily be replaced with natural wear or to personalize the look with custom graphic designs.

Figure 4:
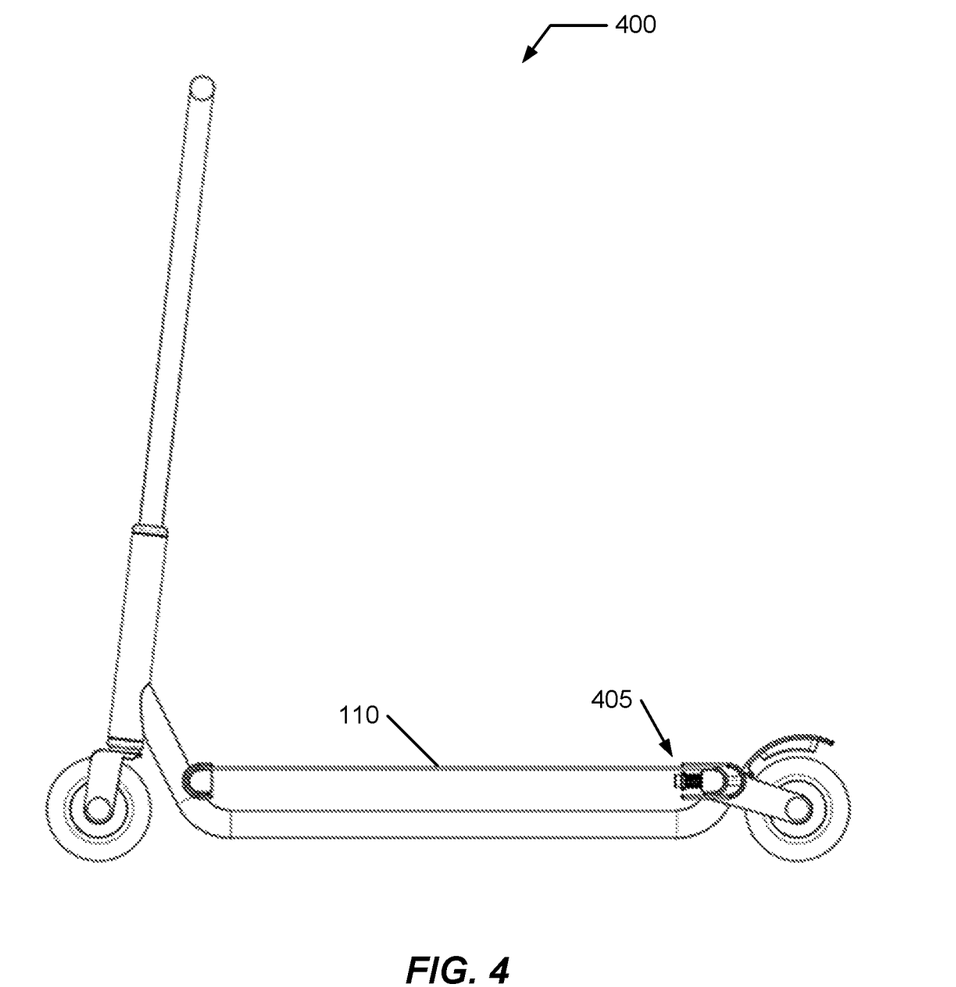
FIG. 4 illustrates a side view of an alternate open rider-controlled recreational vehicle including a rider platform having a platform medium.
Figure 5:
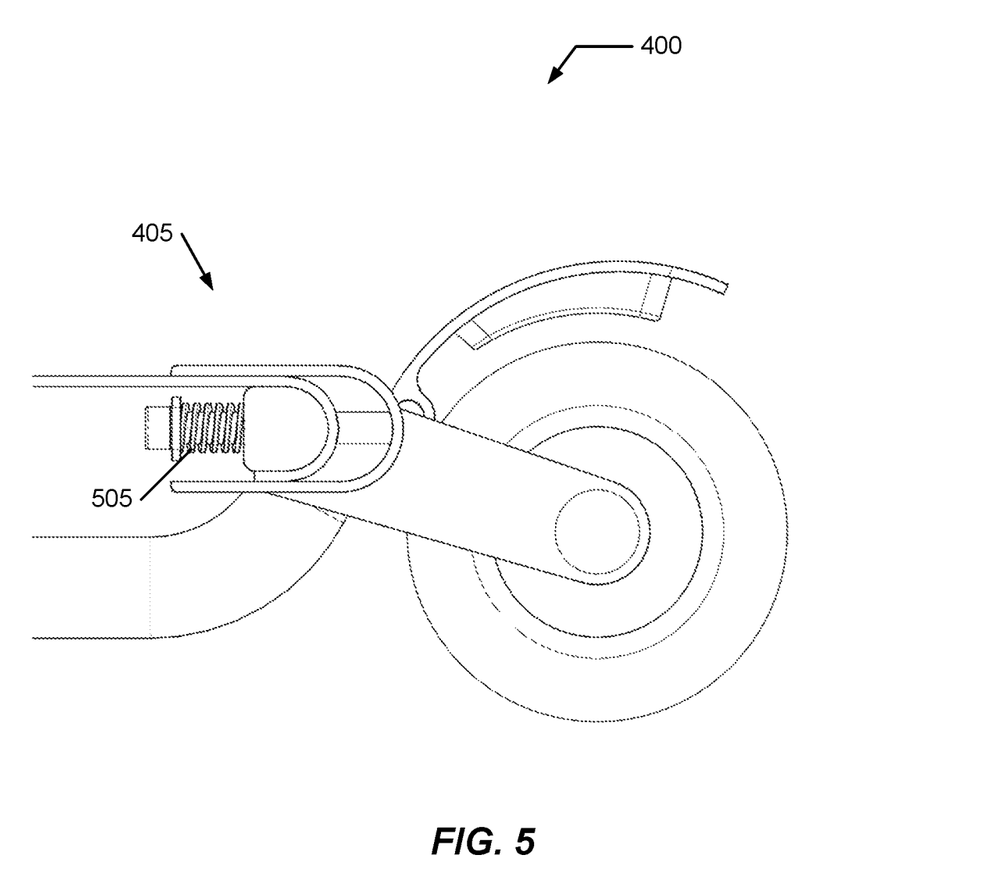
FIG. 5 illustrates a detail view of an alternate tautness control for the recreational vehicle of FIG. 4.

FIG. 4 illustrates a side view of an alternate open rider-controlled recreational vehicle 400 including a rider platform having platform medium 110; and FIG. 5 illustrates a detail view of an alternate tautness control 405 for recreational vehicle 400. Vehicle 400 may, except for tautness control 405, include components, structures, and variations described in the context of vehicle 100 described herein.

Tautness control 405 includes a spring or other tensioning/biasing system to help provide or adjust a desired tension or alternate/supplemental shock absorber for platform medium 110. For example, one implementation may include three pins with two outside pins each supporting a spring and a center pin may include an adjustable bolt. This bolt may be simply adjusted with a wrench or other tool to achieve a desired tension.

A basic system implementation includes a flexible platform, and preferably includes a system that allows the platform to be easily swapped out for new/different platforms (some of which may include different properties (e.g., nylon mesh or rubber) and different designs/looks/logos/art/patterns). Practically there may be a myriad of modalities and methods and systems for tensioning the various platforms.

While the figures illustrate manually driven two and three-wheeled vehicles, the actual motive mechanism is secondary to the invention. As noted herein, some embodiments may include virtually any rider kick-style scooters and motorized scooters or other wheeled transports that include spaced-apart support structures securing opposing ends of a rider platform configured as a sling, hammock, or the like extending between the support structures for supporting a rider while standing, kneeling, sitting, laying, or otherwise positioned on the rider platform and controlling the vehicle. While some embodiments include a mesh deck including natural or synthetic fibers that are woven, intermeshed, combined, connected, joined or otherwise coupled together or mechanically joined, some embodiments may include a molded elastomeric (e.g., natural or synthetic rubber) platform.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An open rider-controlled recreational vehicle for moving over a surface, comprising:
    a motive structure including a rider platform having a top surface upon which a rider is positioned and from which the rider has a control for the vehicle using a hand or foot contacting the surface, the control may include at least occasional propulsion or steering of the vehicle, the rider platform also having a bottom surface opposed to the top surface;
    a frame, coupled to the motive structure, including a first portion, and a second portion spaced apart from said first portion, and further including a first support fixed to the first portion, a second support fixed to the second portion, said supports coupled to the bottom surface of the rider platform;
    wherein an installed platform medium is suspended between said supports, the installed platform medium is intentionally slack and configured to at least perceptively flex, bow, stretch, or bounce when the rider stands, kneels, or sits upon the platform medium.

2. The vehicle of claim 1 wherein the supports include a first mechanism to statically tighten or relax a tautness of the medium providing a first tautness control.

3. The vehicle of claim 2 wherein the supports include a second mechanism to dynamically tighten or relax the tautness of the medium providing a second tautness control.

4. The vehicle of claim 1 wherein said motive structure includes a motor.

5. The vehicle of claim 1 wherein said motive structure is manually operated without a motor.

6. The vehicle of claim 1 wherein the rider platform is coupled to said pair of spaced apart supports using one or more quick-release, tool-less, or other coupler mechanism configured to exchange a substitution platform medium for said installed platform medium.

7. A method for supporting a rider of an open rider-controlled recreational vehicle for moving over a surface, comprising the steps of:

positioning a rider on a motive structure including a rider platform from which the rider has a control for the vehicle using a hand or foot contacting the surface, the control may include at least occasional propulsion or steering of the vehicle with the motive structure including a frame defining a pair of spaced apart supports; and supporting the rider on an installed platform medium suspended between the supports, the installed platform medium is configured to be intentionally slack to at least perceptively flex, bow, stretch, or bounce when the rider stands, kneels, sits, or is otherwise positioned upon the installed platform medium.

8. The vehicle of claim 1 wherein said supports are spaced apart from each other a first distance D1, wherein said first distance D1 is fixed, wherein said installed platform medium includes a portion disposed between said supports, and wherein said portion of said installed platform medium has a second distance D2 with second distance D2 greater than said first distance D1.

9. A rider-controlled vehicle, comprising:

a frame having a first end and a second end spaced apart from said first end by a first distance;

a set of motive elements coupled to said ends;

a first rider platform support coupled to said first end;

a second rider platform support coupled to said second end; and a rider platform coupled to said rider platform supports, said rider platform consisting essentially of a flexible material suspended between said rider platform supports, said flexible material having a first platform end coupled to said first rider platform support and a second platform end coupled to said second rider platform support, said first platform end separated from said second platform end by a second distance greater than said first distance.

\* \* \* \* \*